Patented June 4, 1940

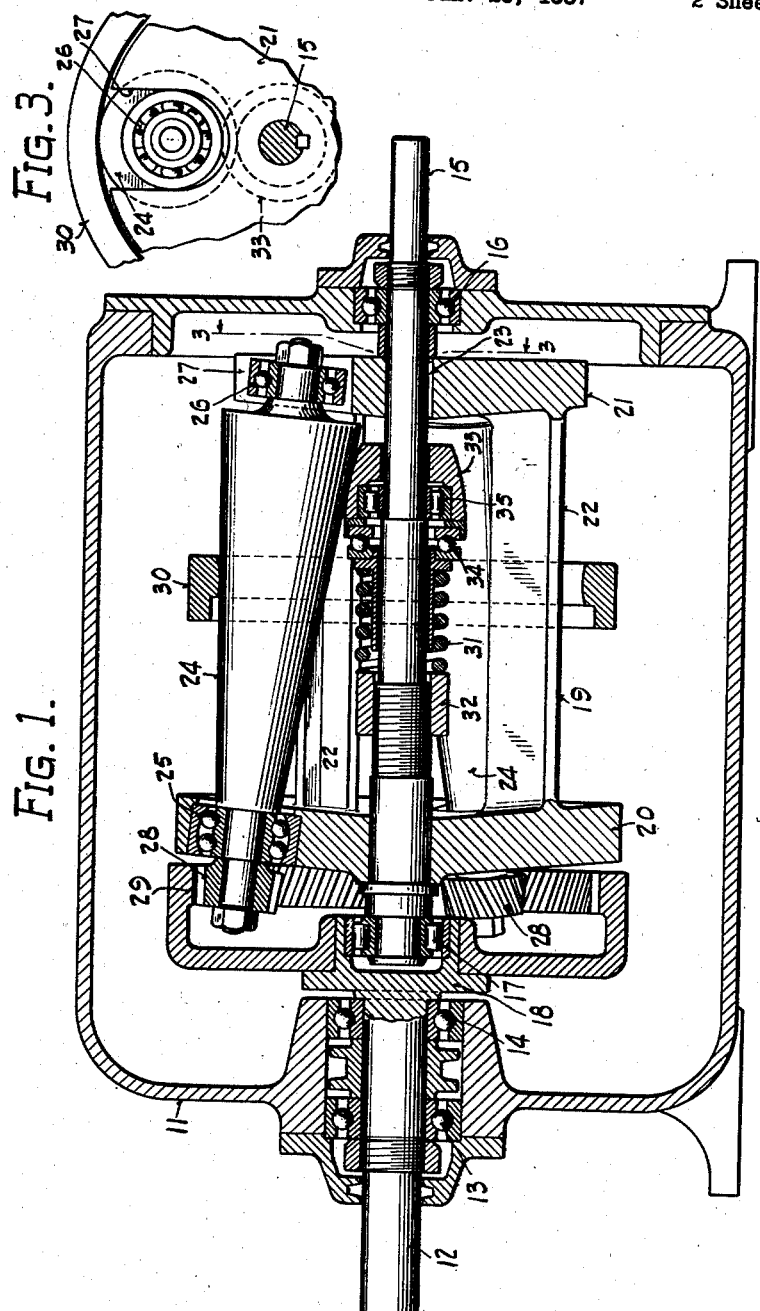

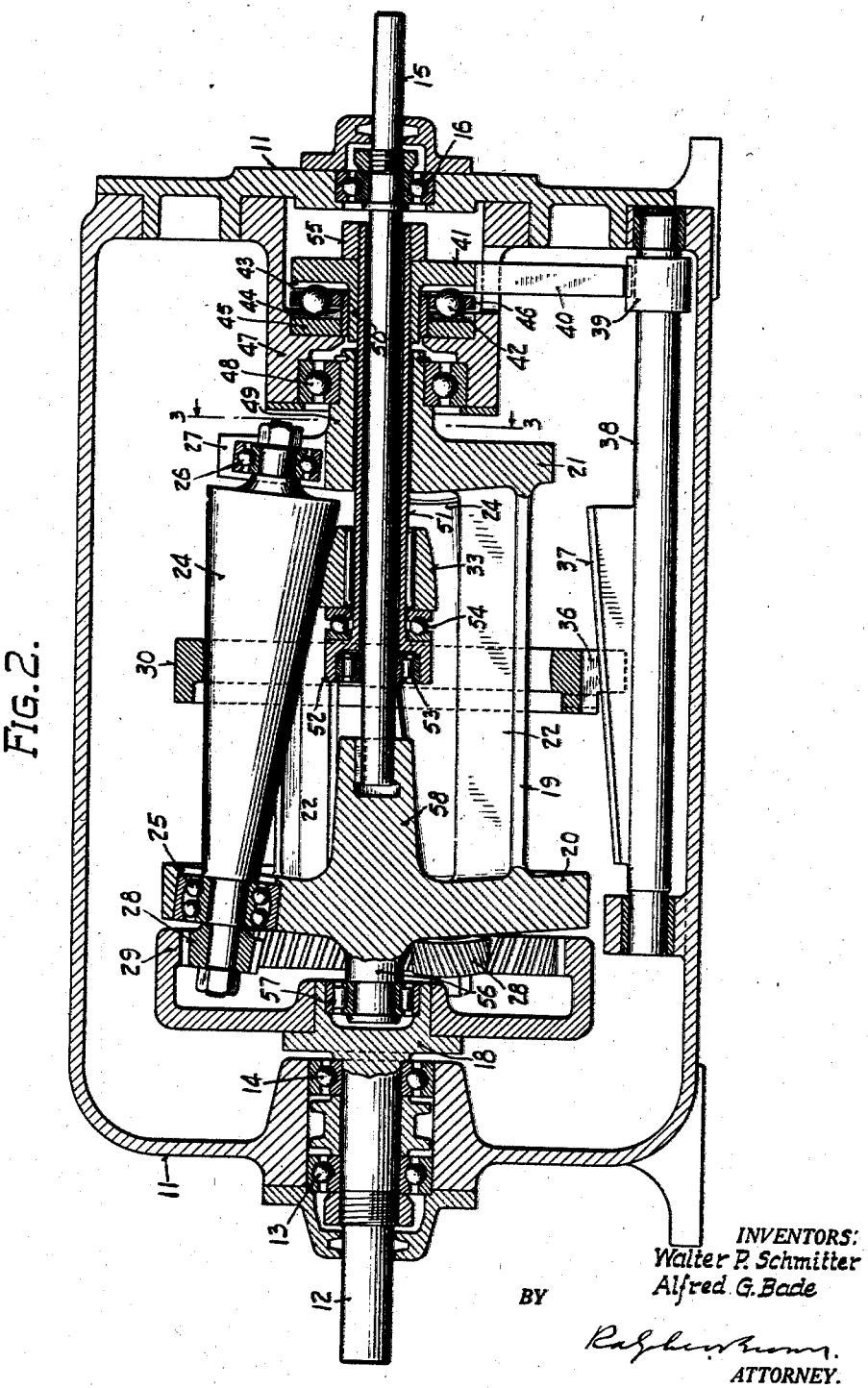

2,203,637

UNITED STATES PATENT OFFICE 2,203,637

VARIABLE SPEED TRANSMISSION

Walter P. Schmitter and Alfred G. Bade, Milwaukee, Wis., assignors to The Falk Corporation, Milwaukee, Wis., a corporation of Wisconsin Application January 23, 1937, Serial No. 121,927

9 Claims. (Cl. 74—281)

This invention relates to variable speed transmissions of the type involving a set of inclined tapered planetary rollers and a contact ring adjustable lengthwise thereof to regulate their planetary action.

A variable speed transmission of this type, which has proven commercially successful, is disclosed in our copending application, Serial No. 52,095, filed November 29, 1935. In the transmission therein described, the planetary rollers are driven through individual planet pinions fixed thereto, from a common sun gear, and power is transmitted therefrom through an encircling gear engaged with the pinions. Planetary action of the rollers is controlled by a traction ring which encircles and contacts the rollers, contact pressures between the rollers and the control ring being maintained by urging the rollers bodily along their outwardly inclined axes. This bodily roller movement involves corresponding movement of the attached planet pinions relative to the encircling gear.

An object of the present invention is to provide a transmission of the character described in which relative movement between the planet pinions and the driven gear is reduced to a minimum.

Another object is to provide an improved transmission in which the sun gear is eliminated and the rollers driven by rotation of their supporting carrier.

Another object is to further improve transmissions of the character described.

Another object is to provide improved means for creating contact pressures between the rollers and the encircling ring.

Other objects and advantages will appear, either expressed or implied, from the following description of an illustrative embodiment of the present invention.

In the accompanying drawings:

Figure 1 is a longitudinal sectional view of a variable speed transmission embodying the present invention.

Fig. 2 is a longitudinal sectional view of a second variable speed transmission embodying this invention in another form.

Fig. 3 is a view upon the line 3—3 of Figs. 1 and 2, showing the method of mounting the ends of the rollers.

The variable speed transmission shown in Fig. 1 of the drawings is somewhat similar to that described in the application identified above. It is enclosed in a housing 11 and includes a driven shaft 12 journalled in bearings 13 and 14 in one end of the housing. A drive shaft 15, aligned with the drive shaft 12, is journalled in a bearing 16 at the opposite end of the housing 11 and in a bearing 17 mounted in a head 18 formed on the end of the driven shaft 12.

Surrounding the drive shaft 15 within the housing 11 is a carrier 19. This carrier comprises a disk or head 20 mounted on the drive shaft 15 adjacent the bearing 17 in the head 18, and a second disk or head 21 likewise mounted on the drive shaft 15 adjacent the bearing 16 in the housing 11. These two heads are rigidly connected by bars 22, preferably T-shaped in cross section. The carrier 19 is secured to rotate with the drive shaft 15 through appropriate means, such as a key 23 in the head 21.

Mounted in the carrier 19 is a set of preferably three tapered relatively inclined planetary rollers 24, so arranged that their outer edges are normally substantially parallel to the common axis of the shafts 12 and 15, and so that their axes, if extended, would meet at a common apex on the extended axis of the shafts 12 and 15.

Each of the rollers 24 is journalled at its small end in a radially fixed spherical or self-aligning bearing 25, mounted in the head 20 of the carrier. The opposite end of each roller is journalled in a radially moveable bearing 26 which is guided in a radial slot 27 in the head 21 of the other end of the carrier, so that each roller is free to swing outwardly in an arc about the fixed center of the spherical bearing 25, as a fulcrum, but at the same time is firmly constrained to rotate with the carrier 19.

Each roller 24 carries a pinion 28 fixed thereto, the several pinions meshing with and driving an encircling ring gear 29, fixed to the head 18 of the driven shaft 12. In this instance, each pinion 28 is fixed to the fulcrumed end of its roller adjacent the bearing 25 where its position relative to the gear 29, is least affected by radial movement of its roller.

The planetary motion of the rollers 24 is controlled by a non-rotating traction ring 30 encircling and contacting the same and shiftable lengthwise thereof to regulate their motion. Any appropriate means, such for instance as that shown in the application above identified or in the copending application of Walter P. Schmitter, Serial No. 121,119, filed January 18, 1937, may be employed for shifting and controlling the position of the ring 30 along the rollers.

It will be noted that, since the carrier 19 is directly driven by the shaft 15, the several rollers 24 receive power from the shaft solely through the carrier and quite independently of the pinions 28, and also that the carrier 19 rotates at a speed fixed with respect to the speed of rotation of the drive shaft 15 regardless of variations in the speed of rotation of the driven shaft 12. It will also be observed that during operation the rollers 24 are urged outwardly into pressure contact with the ring 30 by centrifugal forces set up as a result of carrier rotation, and since the rate of rotation of the drive shaft 15, and consequently that of the carrier, is ordinarily constant, these centrifugal forces remain substantially constant.

In both transmissions shown, provision is made for inducing and maintaining pressure contacts between the rollers 24 and ring 30, in addition to those induced by centrifugal force. In both instances, this is accomplished by the use of a rotary pressure ring 33 centrally disposed within the group of rollers and axially moveable against the larger free ends of the rollers to force them outwardly.

In the transmission shown in Fig. 1, the pressure ring 33 is supported on an axially adjustable bearing 35 mounted on the drive shaft 15, the ring 33 being urged against the inclined surfaces of the rollers 24 by a compression spring 31 confined between it and an appropriate nut 32 in screw threaded engagement with the shaft 15. A suitable thrust bearing 34 is preferably interposed between the ring 33 and spring 31 to permit free rotation of the ring without disturbing the spring 31. With the parts thus arranged, the ring 33 maintains an outward pressure against each of the several rollers proportional to the pressure exerted by the spring 31, which of course may be regulated and determined by appropriate adjustment of the nut 32.

The outward pressure thus exerted by the pressure ring 33 against the free end of each roller 24 is sustained by the traction ring 30 and by the reaction of the bearing 25 acting as a fulcrum, and the resulting pressure between each roller 24 and ring 30 is dependent upon the tension in the spring 31, which is adjustably fixed, and also upon the axial position of the traction ring 30 on the rollers. That is to say, when the ring 30 is disposed near the small ends of the rollers, and consequently near the fulcrum bearing 25, the pressure between the ring 30 and rollers, induced by the ring 33, is higher than when the ring 30 is disposed near the larger ends of the rollers and remote from the fulcrum.

In the transmission shown in Fig. 2, provision is made for rendering the pressure inducing ring 33 responsive to the torque load on the transmission, instead of to the adjustably fixed pressure of a spring, so as to automatically increase the contact pressures between the rollers 24 and traction ring 30 when the load increases and to automatically reduce those pressures as the load decreases. In this instance the torque load on the traction ring 30, induced by the action of the rollers 24, is utilized to energize the ring 33.

For this purpose the traction ring 30 is provided at its periphery with a bifurcated projection 36 adapted to loosely receive the thickened edge portion of a plate or fin 37 which projects radially from a rock shaft 38 journalled in the housing and extending parallel to the axis of the carrier 19. A segmental gear 39, fixed to the rock shaft 38, engages the end of a lever 40 which is toothed to mesh with gear 39. The lever 40 extends radially from and constitutes an actuator for a cam disk 41 rotatable about an axis substantially coincident with the axis of the carrier 19.

The cam means shown in the present application is very similar to that shown and described in the copending application of Walter P. Schmitter, identified above, Serial No. 121,119, filed January 18, 1937.

A plurality of balls 42, seated in radial cam grooves 43 formed in the face of disk 41 and in similar grooves 44 formed in the opposed face of a stationary cam ring 45, function to force the disk 41 axially from the ring 45 in response to movement of the lever 41. The several balls 42 are positioned by an appropriate retainer ring or cage 46.

In this instance, the ring 45 is fixed in a cage 47 fixed at one end to the end wall 11 of the housing and projecting inwardly therefrom. A bearing 48, seated in the inner end of the cage 47, provides support for the adjacent end of the carrier 19 through a supporting trunion 49 journalled in the bearing 48. The disk 41 is provided with an extended hub portion 50 which is centered by the ring 45 and which is seated upon a tubular member 51 loosely surrounding the shaft 15 and providing a force transmitting connection between the disk 41 and ring 33.

The tube 51 is enlarged at one end to form a head 52 containing an axially adjustable bearing 53 through which it is mounted on the shaft 15 for free axial movement. The ring 33 is journalled on the tube 51 and a thrust bearing 54, between the head 52 and ring 33, insures free relative rotation therebetween. A nut 55, threaded on the other end of the tube 51 and bearing against the cam disk 41, may be adjusted to eliminate looseness in the connection between the cam disk 51 and ring 33 and to establish an initial pressure between the ring 33 and rollers 24.

The arrangement is such that any rotative impulse or torque load imposed upon the traction ring 30 by the rollers 24 is transmitted to the cam disk 41 through the fin 37, rock shaft 38, gear 39, and lever 40, tending to rotate the cam disk 41 relative to the cam ring 45 and thereby to urge the ring 33 more forcibly against the rollers 24 whereby the contact pressures between the rollers and ring 30 are increased. Since the torque load on the ring 30 is proportional to the torque load on the transmission, the contact pressures between the rollers and ring 30 are thus made to vary automatically in accordance with changes in the torque load on the transmission, thereby assuring contact pressures of sufficient magnitude to sustain the load when the load is heavy and to avoid unnecessarily high contact pressures when the load is light.

As hereinabove noted, a given pressure between the ring 33 and each roller 24 produces a variable pressure between each roller 24 and the ring 30 which increases automatically as the ring 30 approaches the small or fulcrumed end of the roller. Also the torque responsive mechanism just described functions to increase the pressures between the rollers and ring 30 by automatically increasing the pressures between the ring 33 and rollers. In order to avoid excessive pressures, provision is made for reducing the effect of the torque responsive mechanism upon the ring 33 as the ring 30 is shifted toward the fulcrumed ends of the rollers. This is accomplished in the transmission shown by arranging the thickened edge of the fin 37 at an angle to the rock shaft 38 so that as the ring 30 is shifted toward the fulcrumed ends of the rollers the effective leverage of the fin, at the point of contact with the ring, is reduced.

It will be noted that in the transmission shown in Fig. 2, the carrier 19 is mounted wholly independently of the drive shaft 15. As above pointed out, the carrier is supported at one end by the trunnion 49 journalled in the bearing 48 in the cage 47. The other end of the carrier is similarly supported by a trunnion 56 journalled in a bearing 57 in the head 18 carried by the driven shaft 12. In this instance the forward end of the shaft 15 is keyed or otherwise secured to a hub portion 58 which projects inwardly from the end head 20 of the carrier.

Various changes may be made in either of the embodiments of the invention hereinabove specifically described without departing from or sacrificing the advantages of the invention as defined in the appended claims.

We claim:

1. In a variable speed transmission the combination of a rotary carrier, an axially moveable control ring, a plurality of tapered relatively inclined planetary rollers rotatable with and with respect to said carrier and rockable radially of said carrier into pressure contact with said ring, said carrier having a radially fixed support for one end of each of said rollers, and a pinion fixed to each roller adjacent said support.

2. In a variable speed transmission the combination of a rotary carrier, an axially moveable control ring, a plurality of tapered relatively inclined planetary rollers rotatable with and with respect to said carrier and rockable radially of said carrier into pressure contact with said ring, a radially fixed bearing for one end of each roller, a radial guide for the other end of each roller, and a pinion fixed to each roller adjacent said bearing.

3. In a variable speed transmission the combination of a rotary carrier, an axially moveable control ring, a plurality of tapered relatively inclined planetary rollers rotatable with and with respect to said carrier, each of said rollers being fulcrumed at one end in said carrier to rock radially into pressure contact with said ring and being maintained by said ring in an inclined position with the outer edge of said roller substantially parallel to the axis of said carrier in all axial positions of said ring, and a pinion fixed to the fulcrumed end of each roller.

4. In a variable speed transmission the combination of a rotary carrier, an axially moveable control ring, a plurality of tapered relatively inclined planetary rollers rotatable with and with respect to said carrier and tiltable radially of said carrier into pressure contact with said ring, said rollers being maintained by said ring in an inclined position with the outer edge of said roller substantially parallel to the axis of said carrier in all axial positions of said ring, and a pinion fixed to each roller adjacent that part which is least affected by tilting thereof.

5. In a variable speed transmission the combination of a rotary carrier, an axially moveable control ring, a plurality of tapered relatively inclined planetary rollers rotatable with and with respect to said carrier and tiltable radially of said carrier, a pinion fixed to each roller adjacent that part which is least affected by tilting thereof, and spring urged means for tilting said rollers into pressure contact with said ring.

6. In a variable speed transmission the combination of a rotary carrier, an axially moveable control ring, a plurality of tapered relatively inclined planetary rollers rotatable with and with respect to said carrier and tiltable radially of said carrier, a pinion fixed to each roller adjacent that part which is least affected by tilting thereof, and torque responsive means operable on said rollers to tilt the same into pressure contact with said ring.

7. In a variable speed transmission the combination of a rotary carrier, an axially moveable control ring, a plurality of tapered relatively inclined planetary rollers rotatable with and with respect to said carrier and tiltable radially of said carrier into pressure contact with said ring, said rollers being maintained by said ring in an inclined position with the outer edge of said roller substantially parallel to the axis of said carrier in all axial positions of said ring, a pinion fixed to each roller adjacent the point where it is least affected by tilting thereof, and a drive shaft connected to said carrier independently of said pinions.

8. In a variable speed trasmission the combination of a rotary carrier, a drive shaft extending axially into said carrier, a plurality of tapered relatively inclined planetary rollers rotatable with and with respect to said carrier, a control ring shiftable axially of said carrier to regulate the speed ratio of the transmission, said rollers being radially moveable into pressure contact with said ring, a radially fixed bearing surrounding said drive shaft and radially spaced therefrom, and a supporting hub on said carrier engaged with said bearing to provide support for said carrier.

9. In a variable speed transmission the combination of a rotary carrier, an axially movable control ring, a plurality of tapered relatively inclined planetary rollers rotatable with and with respect to said carrier and tiltable radially of said carrier, a pinion fixed to each roller adjacent that part which is least affected by tilting thereof, and spring urged means coacting with said carrier for tilting said rollers into pressure contact with said ring.

WALTER P. SCHMITTER.
ALFRED G. BADE.